United States Patent
Dubinsky et al.

(10) Patent No.: US 12,346,705 B2
(45) Date of Patent: Jul. 1, 2025

(54) SYSTEM AND METHOD FOR CONTROLLING ACTIONS DEPENDING ON MULTIPLE VALIDATIONS

(71) Applicant: Source Ltd., Valletta (MT)

(72) Inventors: Ilya Dubinsky, Kefar Sava (IL); Shmuel Ur, Shorashim (IL)

(73) Assignee: SHIFT4 TECHNOLOGY LIMITED, Valletta (MT)

( * ) Notice: Subject to any disclaimer, the term of this patent is extended or adjusted under 35 U.S.C. 154(b) by 0 days.

(21) Appl. No.: 18/630,322

(22) Filed: Apr. 9, 2024

(65) Prior Publication Data

US 2024/0256292 A1 Aug. 1, 2024

Related U.S. Application Data

(63) Continuation of application No. 18/585,472, filed on Feb. 23, 2024, now abandoned, and a continuation of application No. 17/898,830, filed on Aug. 30, 2022, now Pat. No. 11,966,757.

(51) Int. Cl.
| | |
|---|---|
| *H04L 9/00* | (2022.01) |
| *G06F 9/445* | (2018.01) |
| *G06F 9/48* | (2006.01) |
| *G06F 11/34* | (2006.01) |
| *H04L 9/32* | (2006.01) |
| *G06F 9/46* | (2006.01) |

(52) U.S. Cl.
CPC ........ *G06F 9/44505* (2013.01); *G06F 9/4881* (2013.01); *G06F 11/3495* (2013.01); *H04L 9/3236* (2013.01); *G06F 9/468* (2013.01)

(58) Field of Classification Search
CPC ............... G06F 9/44505; G06F 9/4881; G06F 11/3495; G06F 9/468; H04L 9/3236
See application file for complete search history.

(56) References Cited

U.S. PATENT DOCUMENTS

| | | | |
|---|---|---|---|
| 8,112,232 B2 | 2/2012 | Parkhurst | |
| 8,904,472 B2 * | 12/2014 | Shaikh | G06F 21/604 709/225 |
| 10,873,462 B1 * | 12/2020 | Frinken | H04L 9/3236 |
| 11,418,402 B1 | 8/2022 | Jakobsson | |
| 2004/0199484 A1 * | 10/2004 | Smith | G06F 16/9027 706/46 |
| 2008/0065670 A1 * | 3/2008 | Cha | G06F 16/2329 |
| 2009/0048807 A1 | 2/2009 | Kikuchi | |
| 2015/0294250 A1 * | 10/2015 | Anerousis | G06Q 10/0635 705/7.28 |
| 2021/0117397 A1 * | 4/2021 | Dalgliesh | G06F 16/2246 |
| 2023/0163970 A1 * | 5/2023 | Riggan | H04L 9/3218 713/168 |

* cited by examiner

*Primary Examiner* — Kevin Ayala

(74) *Attorney, Agent, or Firm* — PEARL COHEN ZEDEK LATZER BARATZ LLP

(57) ABSTRACT

Methods and systems for selecting and executing optimal execution strategies for processes, wherein an optimal execution strategy may be selected from a plurality of execution strategies for example in a look-up table, based on specific process values.

16 Claims, 6 Drawing Sheets

SYSTEM AND METHOD FOR CONTROLLING ACTIONS DEPENDING ON MULTIPLE VALIDATIONS

PRIOR APPLICATION DATA

The present application is a continuation of prior U.S. application Ser. No. 18/585,472 entitled "SYSTEM AND METHOD FOR CONTROLLING ACTIONS DEPENDING ON MULTIPLE VALIDATIONS" and filed Feb. 23, 2024, which is a continuation of U.S. application Ser. No. 17/898,830 entitled "SYSTEM AND METHOD FOR CONTROLLING ACTIONS DEPENDING ON MULTIPLE VALIDATIONS" and filed on Aug. 30, 2022, both applications are incorporated by reference herein in their entirety.

FIELD OF THE INVENTION

Embodiments of the invention are directed to the selection of execution strategies for complex processes, which may increase the speed of execution and/or reduce the required computational resources of execution. In particular, embodiments of the invention are directed to constructing look-up tables comprising a plurality of execution strategies, which may be quickly and efficiently utilized to obtain an optimal execution strategy.

BACKGROUND OF THE INVENTION

Many modern processes are highly complex and include a number of separate operations. Some of these operations may include validations (or permission requests, verifications, etc.), and the outcome of these validations may influence the required outcome of a process. Some of these processes may be carried out on a computer system.

For example, one such process may be computerized authentication, allowing or disallowing access for a person to a restricted area after they display an identification (ID) card. Example operations for this process may include verifying whether or not a photo associated with the ID card is representative of the person as seen by a camera; verifying whether or not the person is known on security systems; verifying whether or not the person has clearance to enter the restricted area; verifying whether or not there has been a security system override (for example, in an emergency); unlocking doors; logging an entry request; informing security services of an unsuccessful entry request; and informing the person that they may or may not enter. There may be a success condition of the process, associated with some or all of the actions. A success condition may be for example a pass for each of the photo and camera verification, the verification for whether the person is known on a security system, and the clearance to the restricted area verification, or alternatively simply a pass for the security override verification. If the success condition is met, the execution of some actions may be required, and if the success condition is not met, the execution of a separate set of actions, or no actions, may be required.

It may be expensive in terms of time or computational resources, for example, to run each verification one after the other (sequentially) and then execute each required action. It may be preferable, for example, that some operations are executed before others, or that certain operations are executed in parallel.

It may be desired to find an optimal strategy to run or execute a process (such as the example above), in order that the process, for example, uses minimal computational resources and/or spends the shortest amount of time. It may be desired to find an optimal strategy based on known properties of the operations of a process. It may be desired to find an optimal strategy in a short amount of time.

SUMMARY OF EMBODIMENTS OF THE INVENTION

One aspect of the invention may provide a method for selecting an optimal execution strategy for a process and/or executing the process, wherein the process may include general properties and specific process values, and the method may include: inputting by a computer processor the specific process values into a look-up table to obtain data indicative of an optimal execution strategy for the process among a plurality of execution strategies in the look-up table, wherein the look-up table may include: a plurality of execution strategies each suitable for the general properties, wherein each execution strategy may include a tree data structure comprising instructions for at least one of: at least one individual validation, and at least one action, wherein each of the at least one individual validation and the at least one action include property variables; and conducting operations of a computer system based on the optimal execution strategy. The general properties may include for example: a quantity of the at least one actions; a quantity of the at least one individual validations; and a global validation condition, wherein the global validation condition is defined by the at least one individual validations.

In some embodiments, a utility function is associated with each execution strategy, wherein each utility function may provide an indication of its associated execution strategy's utility as a function of the property variables; and the method may include selecting the optimal execution strategy based on the utility of each execution strategy.

In some embodiments, at least one execution strategy of the plurality of execution strategies comprises instructions to begin the execution of at least an action of the at least one actions before the execution has finished for at least an individual validation of the at least one individual validations.

In some embodiments, the method may include: constructing a look-up table, wherein constructing a look up table includes: creating a plurality of execution strategies suitable for the general properties; constructing a utility function for each execution strategy; generating a plurality of input parameter configurations for the property variables; inputting the plurality of input parameter configurations into each utility function associated with each execution strategy, to obtain an optimal execution strategy for each input parameter configuration; and storing in computer memory each input parameter configuration with the associated optimal execution strategy.

In some embodiments, creating a plurality of execution strategies includes iteratively permutating at least one decision tree structure.

In some embodiments, constructing a utility function for each execution strategy may include: traversing the tree data structure of each execution strategy in each possible way; constructing a tree function of property variables for each possible way of traversing the tree; and combining each tree function to create the utility function.

In some embodiments, the property variables associated with each individual validation may include at least one of: a cost of executing the individual validation; a time to execute the individual validation; in some cases, a cost of cancelling the individual validation; and a probability of success of the individual validation; wherein each specific process variable may be time dependent or time independent. Costs may include, for example, a use of (in some cases a waste of) computing resources, memory resources, computer networking resources, or goods or services, time spent (e.g., by a computing device or another entity), or any other resource.

In some embodiments, the property variables associated with each action may include at least one of: a cost of executing the action; a time to execute the action; a cost of cancelling the action; a cost of rolling back the action; and a utility of executing the action; wherein each specific action property may be time dependent or time independent. In the case where a specific action property is time dependent, the corresponding costs, times to execute, and/or utilities may have/give different values at different times during the process.

In some embodiments, the instructions may include at least one of: beginning an execution of an action; cancelling an execution of an action; rolling back an action after the action has been executed; beginning an execution of an individual validation; and cancelling an execution of an individual validation.

In some embodiments, the at least one action is at least one of: a computer system causing a transfer of a resource; a computer system allowing access for a user to a computer system; and a computer system allowing access for a user to a location.

One aspect of the invention may provide a system configured to select an optimal execution strategy for a process, wherein the process may include general properties and specific process values, and the system may include: a memory; and at least one processor which may be configured to input the specific process values into a look-up table to obtain data indicative of an optimal execution strategy for the process among a plurality of execution strategies in the look-up table, wherein the look-up table may include: a plurality of execution strategies each suitable for the general properties, wherein each execution strategy includes a tree data structure comprising instructions for at least one of: at least one individual validation, and at least one action, wherein each of the at least one individual validation and the at least one action include property variables; and the at least one processor may be configured to conduct operations of a computer system based on the optimal execution strategy. The general properties may include: a quantity of the at least one actions; a quantity of the at least one individual validations; and a global validation condition, wherein the global validation condition is defined by the at least one individual validations.

In some embodiments, a utility function is associated with each execution strategy, wherein each utility function provides an indication of its associated execution strategy's utility as a function of the property variables; and the at least one processor may be configured to select the optimal execution strategy based on the utility of each execution strategy.

In some embodiments, at least one execution strategy of the plurality of execution strategies comprises instructions to begin the execution of at least an action of the at least one actions before the execution has finished for at least an individual validation of the at least one individual validations.

In some embodiments, the at least one processor may be configured to: construct a look-up table, wherein to construct a look-up table, the at least one processor is configured to: create a plurality of execution strategies suitable for the general properties; construct a utility function for each execution strategy; generate a plurality of input parameter configurations for the property variables; input the plurality of input parameter configurations into each utility function associated with each execution strategy, to obtain an optimal execution strategy for each input parameter configuration; and store in computer memory each input parameter configuration with the associated optimal execution strategy.

In some embodiments, to create a plurality of execution strategies, the at least one processor may be configured to iteratively permutate at least one decision tree structure.

In some embodiments, to construct a utility function for each execution strategy, the at least one processor may be configured to: traverse the tree data structure of each execution strategy in each possible way; construct a tree function of property variables for each possible way of traversing the tree; and combine each tree function to create the utility function.

One aspect of the invention may provide a method for executing an execution strategy for a process, wherein the execution strategy may include a tree data structure which may include linked nodes, wherein the set of nodes may include a root node and at least one leaf node, wherein the method may include: traversing, by a computer system, linked nodes of the tree data structure, starting at the root node, and ending at one of the at least one leaf nodes; and executing, by a computer system, instructions associated with each traversed node, wherein the instructions may relate to at least one validation and at least one action, wherein a route of the traversing may be based on at least one outcome of executing at least one of the at least one validation.

In some embodiments, wherein the instructions may include at least one of: beginning an execution of an action; cancelling an execution of an action; rolling back an action after the action has been executed; beginning an execution of an individual validation; and cancelling an execution of an individual validation.

In some embodiments, the at least one action may include at least one of: a computer system causing a transfer of a resource; a computer system allowing access for a user to a computer system; and a computer system allowing access for a user to a location.

In some embodiments, the tree data structure may be a binary tree data structure.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

DETAILED DESCRIPTION OF EMBODIMENTS
OF THE INVENTION

One skilled in the art will realize the invention may be embodied in other specific forms without departing from the spirit or essential characteristics thereof. The foregoing embodiments are therefore to be considered in all respects illustrative rather than limiting of the invention described herein. Scope of the invention is thus indicated by the appended claims, rather than by the foregoing description, and all changes that come within the meaning and range of equivalency of the claims are therefore intended to be embraced therein.

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention. Some features or elements described with respect to one embodiment may be combined with features or elements described with respect to other embodiments. For the sake of clarity, discussion of same or similar features or elements may not be repeated.

Although embodiments of the invention are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information non-transitory storage medium that may store instructions to perform operations and/or processes.

Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. The term set when used herein may include one or more items.

Unless explicitly stated, the method embodiments described herein are not constrained to a particular order or sequence. Additionally, some of the described method embodiments or elements thereof can occur or be performed simultaneously, at the same point in time, or concurrently.

Figure 1A:
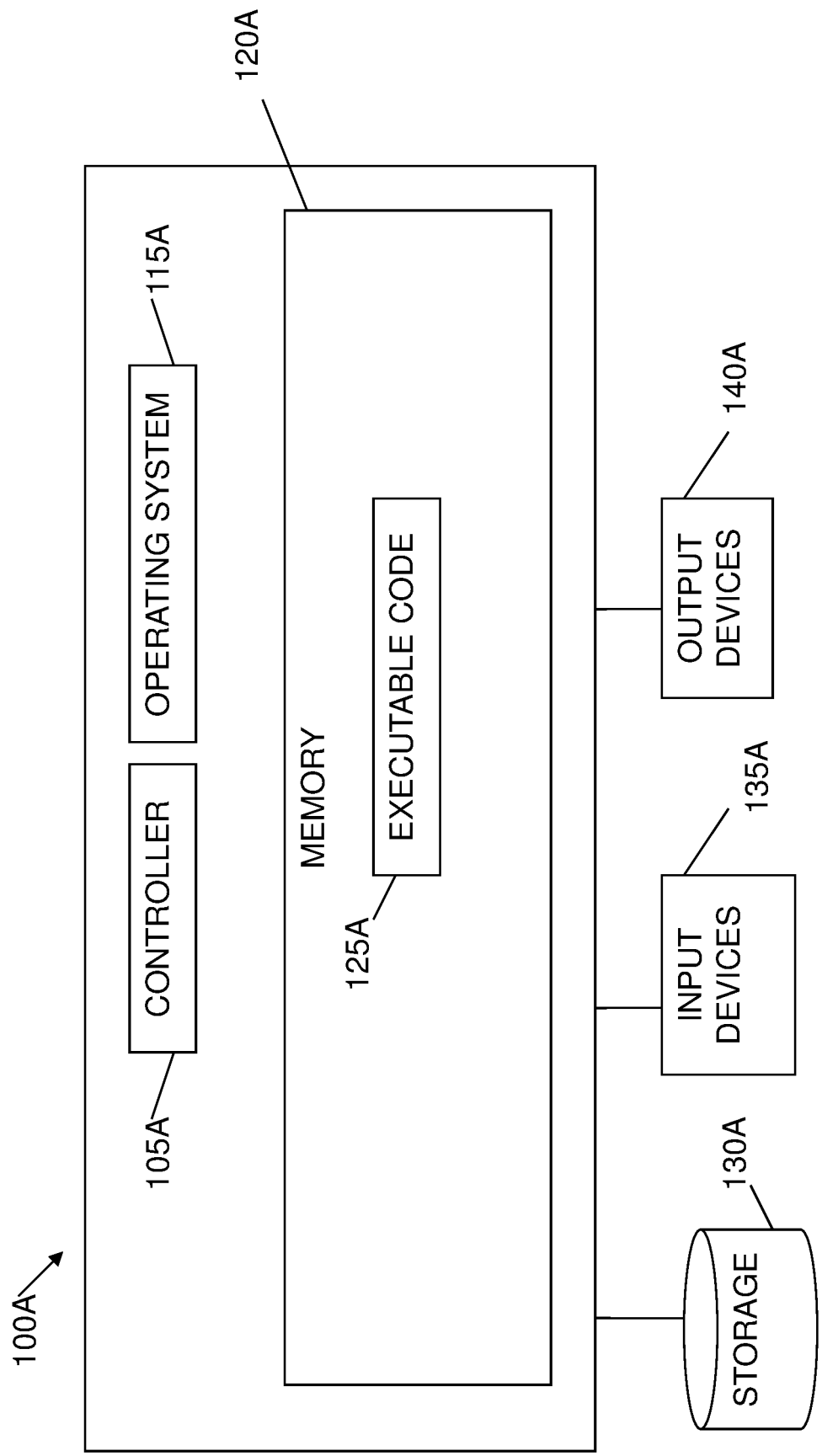
FIG. 1A is a schematic drawing of a system according to some embodiments of the invention.

FIG. 1A shows a block diagram of an exemplary computing device which may be used with embodiments of the present invention. Computing device 100A may include a controller or computer processor 105A that may be, for example, a central processing unit processor (CPU), a chip or any suitable computing device, an operating system 115A, a memory 120A, a storage 130A, input devices 135A and output devices 140A such as a computer display or monitor displaying for example a computer desktop system.

Operating system 115A may be or may include code to perform tasks involving coordination, scheduling, arbitration, or managing operation of computing device 100A, for example, scheduling execution of programs. Memory 120A may be or may include, for example, a Random Access Memory (RAM), a read only memory (ROM), a Flash memory, a volatile or non-volatile memory, or other suitable memory units or storage units. At least a portion of Memory 120A may include data storage housed online on the cloud. Memory 120A may be or may include a plurality of different memory units. Memory 120A may store, for example, instructions (e.g. code 125A) to carry out a method as disclosed herein. Memory 120A may use a datastore, such as a database. Memory 120A may store, for example, a look-up table, as may be used during a method as disclosed herein.

Executable code 125A may be any application, program, process, task, or script. Executable code 125A may be executed by controller 105A possibly under control of operating system 115A. For example, executable code 125A may be, or may execute, one or more applications performing methods as disclosed herein, such as controlling or executing actions and validations in a process. In some embodiments, more than one computing device 100A or components of device 100A may be used. One or more processor(s) 105A may be configured to carry out embodiments of the present invention by for example executing software or code.

Storage 130A may be or may include, for example, a hard disk drive, a floppy disk drive, a compact disk (CD) drive, a universal serial bus (USB) device or other suitable removable and/or fixed storage unit. Data described herein may be stored in a storage 130A and may be loaded from storage 130A into a memory 120A where it may be processed by controller 105A. Storage 130A may include cloud storage.

Input devices 135A may be or may include a mouse, a keyboard, a touch screen or pad or any suitable input device or combination of devices. Output devices 140A may include one or more displays, speakers and/or any other suitable output devices or combination of output devices. Any applicable input/output (I/O) devices may be connected to computing device 100A, for example, a wired or wireless network interface card (NIC), a modem, printer, a universal serial bus (USB) device or external hard drive may be included in input devices 135A and/or output devices 140A.

Embodiments of the invention may include one or more article(s) (e.g., memory 120A or storage 130A) such as a computer or processor non-transitory readable medium, or a computer or processor non-transitory storage medium, such as for example a memory, a disk drive, or a USB flash memory encoding, including, or storing instructions, e.g., computer-executable instructions, which, when executed by a processor or controller, carry out methods disclosed herein.

Figure 1B:
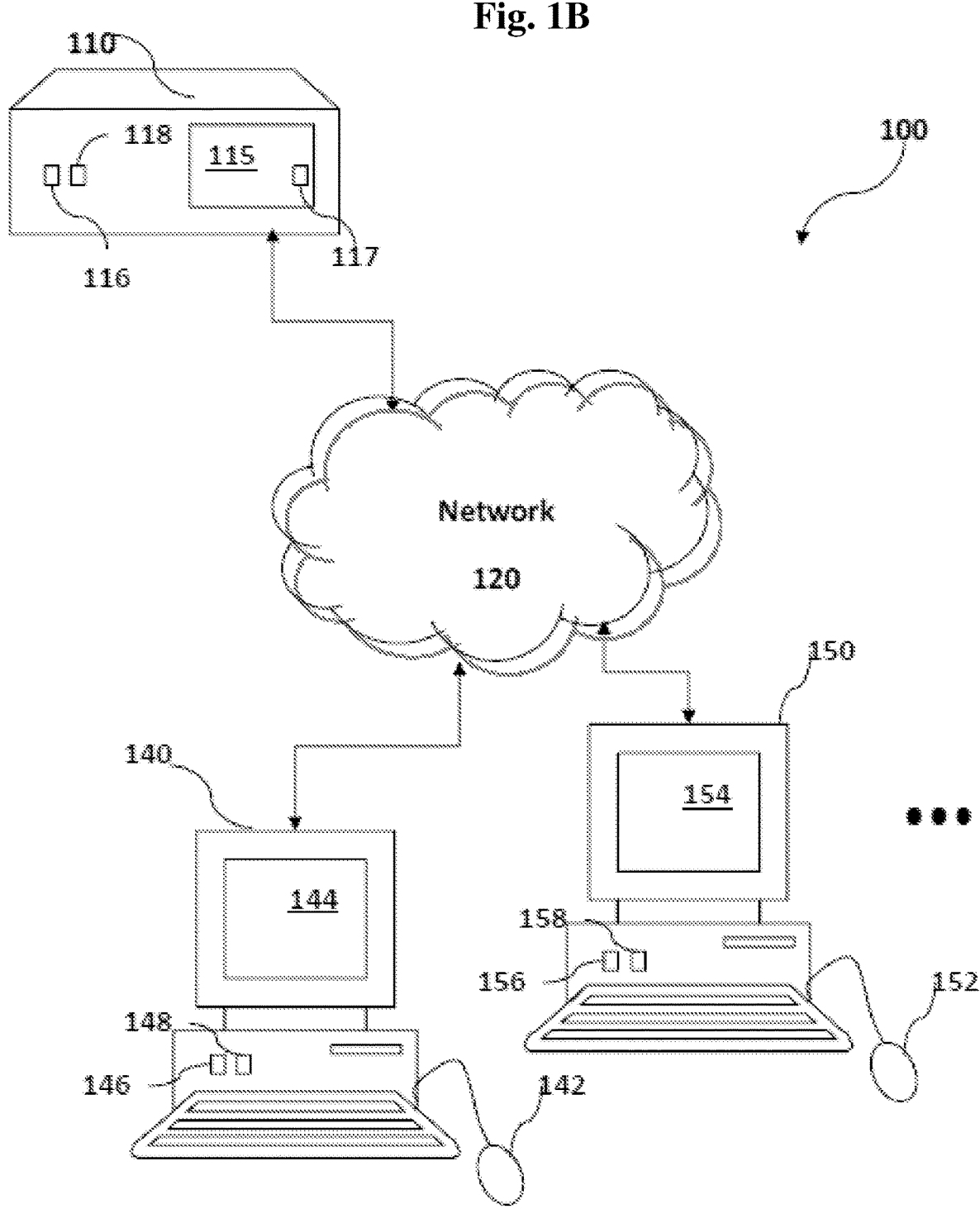
FIG. 1B is a schematic drawing of a system according to some embodiments of the invention.

FIG. 1B is a schematic drawing of a system 100 according to some embodiments of the invention. System 100 may include one or more server(s) 110, database(s) 115, and/or computer(s) 140, 150, . . . , etc., each of which may be or include computers (e.g., computer 100A) or components, such as shown in FIG. 1A. Any or all of system 100 devices may be connected via one or more network(s) 120. Network 120, which connects server(s) 110 and computers 140 and 150, may be any public or private network such as the Internet. Access to network 120 may be through wire line, terrestrial wireless, satellite, or other systems well known in the art.

Server(s) 110 and computers 140 and 150, may include one or more controller(s) or processor(s) 116, 146, and 156, respectively, for executing operations according to embodiments of the invention and one or more memory unit(s) 118, 148, and 158, respectively, for storing data (e.g., general properties of a process, specific process values of a process, look-up tables including execution strategies according to embodiments of the invention) and/or instructions (e.g., execution strategies according to embodiments of the invention) executable by the processor(s). Processor(s) 116, 146, and/or 156 may include, for example, a central processing unit (CPU), a digital signal processor (DSP), a microprocessor, a controller, a chip, a microchip, an integrated circuit (IC), or any other suitable multi-purpose or specific processor or controller. Memory unit(s) 118, 148, and/or 158 may include, for example, a random-access memory (RAM), a dynamic RAM (DRAM), a flash memory, a volatile memory, a non-volatile memory, a cache memory, a buffer, a short-term memory unit, a long-term memory unit, or other suitable memory units or storage units.

Computers 140 and 150 may be servers, personal computers, desktop computers, mobile computers, laptop computers, and notebook computers or any other suitable device such as a cellular telephone, personal digital assistant (PDA), video game console, etc., and may include wired or wireless connections or modems. Computers 140 and 150 may include one or more input devices 142 and 152, respectively, for receiving input from a user (e.g., via a pointing device, click-wheel or mouse, keys, touch screen, recorder/microphone, other input components). Computers 140 and 150 may include one or more output devices 144 and 154 (e.g., a monitor or screen) for displaying data to a user provided by or for server(s) 110.

Any computing devices of FIGS. 1A and 1B (e.g., 100A, 110, 140, and 150), or their constituent parts, may be configured to carry out any of the methods of the present invention. Any computing devices of FIGS. 1A and 1B, or their constituent parts, may include a speculative execution engine, which may be configured to perform some or all of the methods of the present invention. In some embodiments, the speculative execution engine may decide which actions and individual validations to execute and when to execute them. Further, any of devices shown in FIGS. 1A and 1B may carry out actions controlled by a speculative execution engine; for example, a device in FIGS. 1A and 1B (e.g., computer 140) may determine what actions to execute in a user ID/verification process, and another device (e.g., computer 150) may carry out that ID/verification process by interacting with a user.

Embodiments of the present invention may include methods for selecting an optimal execution strategy for a process, such as a computerized validation, a file transfer, exchanging data via a computer network, or other processes.

An example process may, in some embodiments, be described as a procedure. The example process may, in some embodiments, relate to actions which require some validation or verification to be run or executed. The process may, for example, relate to a resource transfer, or allowing or disallowing user access to a system or location.

The process may include at least one action. The process may include at least one individual validation.

Individual validations within a process may alternatively be named validation primitives, validations, verifications, confirmations, authorizations, authentications, or certifications. In some embodiments, an individual validation may, when executed, check the status of or state of part of the process in order to determine if an action should be executed. For example, a validation may check the status of a computer memory, for example, checking whether a Boolean variable is recorded as True or False in computer memory. In this example, the individual validation may pass if the Boolean variable is recorded as True and may fail if the Boolean variable is recorded as False (or the inverse may be true i.e., True=fail and False=pass). The individual validation may also fail if the Boolean variable cannot be found in the computer memory. The Boolean variable may relate to real-world metric. In one specific example, an individual validation may check the status of a Boolean variable in memory, wherein the Boolean variable records whether a person has access to a restricted area. In this case, if the individual validation passes, actions may be executed such that the person may subsequently be allowed into the restricted area (e.g., by unlocking a door).

In some embodiments, an individual validation may perform a calculation or an algorithm. For example, an individual validation may perform a checksum, wherein if the checksum succeeds, the individual validation may pass, and if the checksum fails, the individual validation may fail. The checksum may relate to a real-world metric. In one specific example, the individual validation may be a checksum which calculates whether a given value representing a person's security clearance, minus a value stored in memory representing a required security clearance for accessing a restricted area, is more than or equal to zero (and hence whether an action is executed such that the person is allowed to enter into the restricted area). In this case, if the individual validation passes, the person may subsequently be allowed into the restricted area (e.g., by unlocking a door).

An individual validation may have some probability of success and some probability of failure, where each probability may in some embodiments be known or be estimated. Estimations of probability of success or failure of an individual validation may be based on past data. For example, in the example of allowing entry or access, probabilities may be estimated based on what proportion of entry requests made in the past have succeeded or failed (as may be stored in computer memory). In some embodiments, an individual validation may be configured to execute on at least one computational device (e.g., the computational devices of FIGS. 1A and 1B).

In some embodiments an individual validation may when executed or calculated be configured to output a binary or Boolean value, indicating a pass or fail. Additionally or alternatively, an individual validation may when executed produce a number (e.g., an integer, such as −3, 0, 1, 47, etc.).

In one embodiment, an individual validation may include checking a database for the presence of one or more data points. In a non-limiting embodiment, an individual validation may include performing one or more checksums.

Actions may also be known as executables, acts, algorithms, or individual processes. In some embodiments, an action may be any action that may be controlled by and/or carried out by at least one computational device (e.g., the computational devices of FIGS. 1A and 1B)

In one non-limiting embodiment, an action may include establishing a connection between at least two computational devices. In another non-limiting embodiment, an action may include causing a transfer of a resource. In another non-limiting embodiment, an action may include allowing access for a user to a computer system. In another non-limiting embodiment, an action may include allowing access for a user to a location.

Actions and individual validations may be configured to run/be executed in parallel or sequentially (e.g., serial execution). In some embodiments, executing actions and individual validations in parallel may lead to actions and individual actions being executed in a shorter time. Executing actions and individual validations sequentially may lead to a smaller computational cost, for example, if not all individual validations or actions actually need to be executed.

In some embodiments, executing an action may be split into two parts: computing and committing. Computing may include parts of the action which do not involve making substantial changes to, for example, computer memory (e.g., changing what is stored in external memory on an external server). Committing may include parts of the action which do involve making said substantial changes. By way of an example, where an action includes calculating a data value at a computing device, and further includes transferring the data value to an external computing device, calculating the data value may be said to be the computing and transferring the data value may be said to be the committing. Computing may comprise a larger portion of an executing time of the action than the committing. In some embodiments, the computing of an action may be executed, but then the committing delayed (i.e., the committing may not happen immediately after the computing). The committing may be delayed until after a result of an individual validation is known. An action may, in some embodiments, be freely cancelled (e.g., no rollback is needed) if the action has not yet been committed (e.g., this may be desirable if an individual validation fails).

An action may be a multi-party action. In one example, the party deciding when to commit, tells another party which actually commits. The decision to commit takes time to travel from one party to another, and thus the time of deciding to commit may not be the end of the execution of the action.

In some embodiments, an action may include multiple sub-actions, which may be executed separately. If the action must be executed, then each sub-action must be executed.

In some embodiments, an individual validation may check/view the state of some computational device/component/memory or perform related processes. In some embodiments, an action may change/alter the state of some computational device/component/memory or perform related processes.

An example process may have a success condition, in which a group (possibly all) of the actions may be required to be executed/carried out. A process may have a failure condition, in which a different group of actions may be required to be executed/carried out. In some embodiments, the failure condition may require that no actions are executed/carried out. In some embodiments, the success condition may require that all actions are carried out. In some embodiments, all actions may either be associated with the success or failure condition. For example, for a process for negotiating/establishing a Wi-Fi connection between a computer and a router, there may exist two actions: assigning a frequency band to the computer and sending initial confirmation signals between the computer and router. If the success condition is passed (which may be related to various individual validations, e.g., checking the computer is not on a device blacklist), then it may be required that both actions are executed. If the success condition is not passed, then it may be required that neither action is executed.

An example process may include a global validation (or a definition of the global validation). The global validation may define the success condition and the failure condition of the process. The global validation may include a binary function. The global validation may be defined in terms of Boolean logic or algebra.

A global validation may pass if, for example, all individual validations have passed, one individual validation has passed, a certain number or proportion of validations has passed, or a specific combination of validations has passed, etc. For example, an example process may, among other operations, check whether a user is allowed to access a computational resource (e.g., a classified document stored digitally), where this process may have four validations. Validation 1 may perform a calculation using user-inputted values and return a pass only if the calculation exceeds some value. Validation 2 may check a user-inputted value against another value stored in memory and return a pass only if the values are the same. Validation 3 may take a hash function of a user-inputted value, compare the result of this against another hash value stored in memory, and return a pass only if the hash-values are identical (e.g., a password check). Validation 4 may check the value of an integer variable stored in memory and return a pass only if the integer variable is a multiple of 3. To name a few examples, for the global validation to pass, it may be required that all of validations 1, 2, 3, and 4 should pass; any of the validations 1, 2, 3, or 4 should pass; at least half of the validations should pass; at least three quarters of the validations should pass; at least validation 3 as well as at least one other of validations 1, 2, or 4 should pass; etc.

By way of a further example, in the case in which there are three individual validations: $V_1$, $V_2$, and $V_3$, one possible global validation $V_G$ may be defined in the example manner (where subscript "pass" represents the validation passing and "fail" represents the validation failing):

$$V_{G\_pass} = V_{1\_pass} \text{ AND } V_{2\_pass} \text{ AND } V_{3\_pass}$$

In the above example, for the global validation $V_G$ to pass, each of the individual validations must pass. By way of a different example, global validation $V_G$ may be defined in the following example manner:

$$V_{G\_pass} = (V_{1\_pass} \text{ AND } V_{2\_pass}) \text{ OR } (V_{2\_fail} \text{ AND } V_{3\_pass})$$

In the above example, for the global validation $V_G$ to pass, either both of $V_1$ and $V_2$ must pass, or $V_2$ must fail whilst $V_3$ must pass. There may be many other possible global validation definitions.

In other embodiments, a global validation may be defined differently. For example, a global validation may be defined with algebra. This may be in an embodiment, where some or all the individual validations return a number value. For example, a global validation may be defined as follows:

$$V_{G\_pass} = \text{True IF } 2 \leq V_1 + V_2 + V_3$$

In the above example (where $V_1$, $V_2$, and $V_3$ return either 0 or 1) for the global validation $V_G$ to pass, at least two of $V_1$, $V_2$, and $V_3$ must pass. There may be many other possible global validation definitions.

Each action and each individual validation may be described by property variables. Property variables may additionally or alternatively be known as action and/or (individual) validation variables.

In some embodiments, the property variables associated with each individual validation may include for example:
a cost of executing the individual validation;
a time to execute the individual validation;

in some embodiments a cost of cancelling the individual validation; and/or a probability of success of the individual validation.

Other or different variables may be used.

In some embodiments, the property variables associated with each action may include for example:

a cost of executing the action;

a time to execute the action;

a cost of cancelling the action;

a cost of rolling back the action; and/or a utility of executing the action;

Other or different variables may be used.

Any of the above property variables may, in some embodiments, be time independent. In some embodiments, a cost of cancelling an action, a cost of rolling back an action, and/or a utility of executing an action may be time dependent, and the other property variables may be time independent. In some embodiments, only the utility of executing an action is time dependent.

Any of the above property variables may, in some embodiments, be time dependent. Some or all of the property variables in such embodiments may be described as time dependent property functions.

Executing an individual validation or an action may include running the validation or action; cancelling an individual validation or an action may include stopping the running of the validation or action, for example, part way through the running/execution of the validation/action; and rolling back may include undoing the effects of an already executed action, for example, if a resource (e.g., an encrypted or unencrypted file/document, a computer program, computational login details etc.) was transferred from A to B during execution of an action, rolling back the action may transfer the resource from B to A.

In some non-limiting embodiments, an action may fail when a party attempts to execute the action. In such an event, all other actions may need to be cancelled or rolled back.

A cost may, for example, relate to a computational cost, such as the amount of computational resources are needed to carry out the executing, cancelling, or rolling back; an economic cost; or a resource cost.

A time may relate to the time taken to carry out the executing, cancelling, or rolling back. The time may additionally or alternatively be a measure of computational time.

In some embodiments, time may relate to the total time to execute an operation, whereas cost may be measured in various ways specific to a process. For example, a cost may describe the processor time to execute an operation (both given in units of seconds) (total time and processor time may be different when multiple processors/processor cores are available).

A probability of success of an individual validation may be some probability (or chance or odds) that an individual validation passes or is successful. For example, if in the case that an individual validation relates to verifying whether a computational resource is present at a memory, the probability of success of the individual validation is the probability that said computational resource is present at said memory.

A utility of executing the action, may refer to some value or benefit to the execution of the action. Utility of executing an action may be time dependent. In some embodiments, the utility of executing an action may be the only category of property variable that is time dependent. For example, where the action is the transfer of a resource, it may be beneficial (i.e., higher utility) if the resource is transferred earlier rather than later. By way of a further example, an action may involve transferring the content of webpage from a server to a computational device of a user (for example, because of or in response to a click by a user). The utility may be greater if the webpage content is transferred in a shorter time, since it may be desirable to maximize user engagement with the webpage. For example, if the webpage loads for the user in a time of less than 2 seconds, the user may be substantially more likely to stay on the webpage and interact with the webpage, than if the webpage loaded for the user in a time of more than 10 seconds (which could cause the user to lose interest in the webpage). Thus a utility may have a certain unitless value if an event happens in under a threshold amount of time; or if some measure is less than or more than a threshold.

In some embodiments, where a utility of executing an action is time dependent and falls quickly over time, the corresponding action may be described as high priority. In some embodiments, where a utility of executing an action is time independent or is time dependent but falls relatively slowly over time, the corresponding action may be described as low priority. There may be a high utility/value in executing a high priority action quickly/soon after the beginning of a process.

Property variables may take different forms, depending on the process. For example, a process may relate to computerized authentication where a person may be allowed or disallowed access to a restricted area after they display an identification (ID) card. The process may include two individual validations and two actions. The first individual validation may include verifying whether a photo associated with the ID card is representative of the person as seen by a camera. The second individual verification may include verifying whether a name associated with the ID card is present on a digital list of names that are allowed to enter the restricted area, as stored on computer memory. If both individual validations pass, the two actions may need to be executed (the global validation condition for this process). The first action may include unlocking a door to the restricted area, and the second action may include logging the entry of the person to the restricted area on a computer memory in a server. Rolling back the first action may include relocking the door. Rolling back the second action may include deleting the restricted area entry log of the person in the server.

For this restricted area example, each cost may be derived from multiple considerations. A cost may be based on a computational complexity of executing, cancelling, or rolling back the corresponding action/individual validation. Each cost may additionally or alternatively be based on a security risk to the restricted area. For example, the value assigned to the cost of rolling back the first action (relocking the door) may be very high, since the security implications of unlocking the door for an invalid person are potentially very high, whereas rolling back the second action (removing a log entry from a server) may have few security implications, and so the value assigned to the cost of rolling back the second action may be smaller. Each utility may be based on a benefit of the corresponding action and may be time dependent. For example, it may be that there is an advantage to reducing delays at security doors if the first action (unlocking doors) is executed quickly, for example, within 10 seconds, and a corresponding utility may reflect that. It may be that there is no particular advantage to quickly executing the second action (logging the entry at a server), and as such, the corresponding utility may not be time dependent. Focusing on the first individual validation (verifying that the photo is representative of the person), the cost of executing the validation may be in arbitrary units and be based on the computational complexity of executing the comparison (e.g., the comparing photos of validation 1 may be more computationally complex than the comparing names of validation 2), the time to execute the validation may be the time in seconds the process is expected to take from start to finish, the cost of cancelling the individual validation may be based on the computational complexity of cancelling (likely to be small), and the probability of success of the individual validation may accept a unitless value between 0 and 1 for the likelihood of success of the validation, which may be based on past data (e.g., determined from successful and unsuccessful entry logs stored on the server). A cost may be unitless.

Each of the property variables (e.g., each of the cost of executing the individual validation; the time to execute the individual validation; the cost of cancelling the individual validation; the probability of success of the individual validation; the cost of executing the action; the time to execute the action; the cost of cancelling the action; the cost of rolling back the action; and the utility of executing the action) may be configured to receive/store/utilize an actual value/data point during some embodiments of the present invention. The property variables may be configured to receive corresponding specific process values as explained below.

The process/a specific process, for example as discussed above, may be described in terms of general properties and specific process values. The general properties may relate to many similar processes, and the specific process values may relate to a specific process of the many similar processes.

General properties may include the number or quantity of actions, the number or quantity of individual validations, and the global validation (definition/condition) for the process. For example, in the restricted area example, there was an individual validation for verifying whether a photo associated with the ID card is representative of the person as seen by a camera, and another individual validation for verifying whether a name associated with the ID card is present on a digital list of names that are allowed to enter the restricted area, and there were no further disclosed individual validations. Thus, the quantity of individual validations for this example is two. Similarly in the same restricted area example, there was an action for unlocking a door to the restricted area, and an action for logging the entry of the person to the restricted area on a computer memory in a server, and there were no further disclosed actions. Thus, the quantity of actions for this example is two. In the same restricted area example, it was required that both validations pass, in order that the actions should be executed. Thus, the global validation condition for this example is that all individual validations must pass.

Specific process values may be values, or, in some cases/embodiments, time dependent functions which may correspond to the property variables. In some embodiments, specific process values (or functions) may be the actual values (or functions) indicative of a real and specific process (whereas property variables may simply be variables or dummy variables). Specific process values may be determined, estimated, or measured by a user, or specific process values may be determined, estimated, or measured by a computing device.

For example, a process may exist for negotiating/establishing a channel for a cell phone to work on. Individual validations for this process may, for example, include verifying that the cell phone has a valid SIM card, verifying that the SIM card is not on a police database, verifying that the SIM card has a valid associated phone contract, and verifying that the SIM card has sufficient associated credit. The global validation may require that the first two verifications pass and at least one of the last two verifications passes. Actions for this process may include assigning network bandwidth to the cell phone and establishing a connection between the cell phone and another device. In this example the general properties may be: 4 validations, 2 actions, and a global validation given by a generalized relationship of $V_{G\_pass}=(V_{1\_pass}$ AND $V_{2\_pass}$ AND $(V_{3\_pass}$ OR $V_{4\_pass}))$. In this example, a small sample of the specific process values may include: the verification of verifying that a SIM card is not on a police database has a 99% probability of success, has a cost of 1, which may be defined in arbitrary units, but may be related to the bit complexity of executing the operation, and may take a time of 10 seconds; and the action of assigning network bandwidth to the cell phone may have a cost of 2 in the same units as above, may take a time of 15 seconds, and may have a utility of 15 in user-defined units if fully executed in less than or equal to 20 seconds and a utility of 5 if fully executed in more than 20 seconds. There may exist many more or alternative specific process values for the above process. When finding/determining execution strategies that are applicable to a process, such as the process above, it may be necessary only to know the general properties, and may not be necessary to know the specific process values (the execution strategies may need the same number of validations and actions as the process and the same generalized definition of a global validation). Finding/determining execution strategies is discussed elsewhere herein.

Specific process values may comprise system statistics, which may be the same for all processes in some class of processes, and transaction statistics, wherein transaction statistics may be related to the probability of success for each individual validation. In some embodiments, system statistics are all the specific process values which are not a probability (e.g., all costs, times, and utilities).

Embodiments of the invention may include strategies for executing the process. Strategies may additionally or alternatively be known as policies, schemes, approaches, execution strategies, etc.

Execution strategies may be used to carry out a process. An execution strategy may direct a computational device as to which actions and individual validations to execute, cancel, or roll back and when. In some embodiments, an execution strategy may be a branching tree structure. In some embodiments, an execution strategy may be a binary tree structure (e.g., this may be preferable where the output of individual validations is of a binary or Boolean form). While a tree is used as an example structure, other structures may be used in different embodiments.

A tree structure may include nodes connected by links, where a root node represents the start of the process, and conditional decisions are made to branch, via links, to nodes connected to the root node, which in turn may connect to other nodes via links. Nodes (or the links between them) may include instructions. Each instruction or set of instructions may relate to or describe at least one action and/or at least one individual validation.

In some embodiments, nodes of a tree structure may include decision points, each decision point represented in part by one or more links to other nodes. Decision points may relate to the outcome of one or more individual validations and may decide which branch of a decision tree should be traversed or used next. In some embodiments, every individual validation may end with a decision point and every action may be started at a decision point. There may also be a decision point at the beginning of the strategy.

In some embodiments, the instructions associated with each strategy may include, for example:
beginning an execution of an action;
cancelling an execution of an action;
rolling back an action after the action has been executed;
beginning an execution of an individual validation; and
cancelling an execution of an individual validation.

Beginning may refer to initiating or starting the execution of instructions or algorithms related to the action or individual validation. Once the execution has begun, it may run to completion unless otherwise interrupted/cancelled.

Cancelling may refer to stopping the execution of instructions or algorithms related to the action or individual validation. It may additionally refer to undoing or reversing some or all of the effects of the instructions executed so far.

Rolling back may be performed for an action which has already been completely or substantially executed. Rolling back may refer to undoing or reversing the some or all of the effects of a completed (or substantially completed) action.

A tree structure may include multiple paths from a root node of the tree structure to multiple leaf nodes of the tree structure. A path may not, in some embodiments, contain the same instruction for the same action or individual validation more than once. In said embodiments, actions and individual validations may appear in multiple places in the tree, as long as they are never on the same path from root to a leaf. For example, in an embodiment in which one executes a first validation and then a second validation, the second validation may appear twice in the tree; it appears after the first validation succeeds and also after it fails.

Embodiments of the present invention may disclose methods for selecting an optimal execution strategy for a process, wherein an optimal execution strategy may be chosen from a selection of many possible execution strategies.

An optimal execution strategy may be optimal if it is the execution strategy or one of the execution strategies of the selection of many possible execution strategies which has the highest, or one of the highest, expected utilities. Instead of the expected value of utility, other mathematical averages may be used.

Utility (or total utility) may refer to some value or benefit to the execution of the process using a certain strategy. It may be calculated using utility functions, as described herein. Utility may be a function of utility property variables and cost property variables. Utility property variables (e.g., utility of executing an action) may add to the total utility. Cost property variables may take from the total utility.

Figure 2:
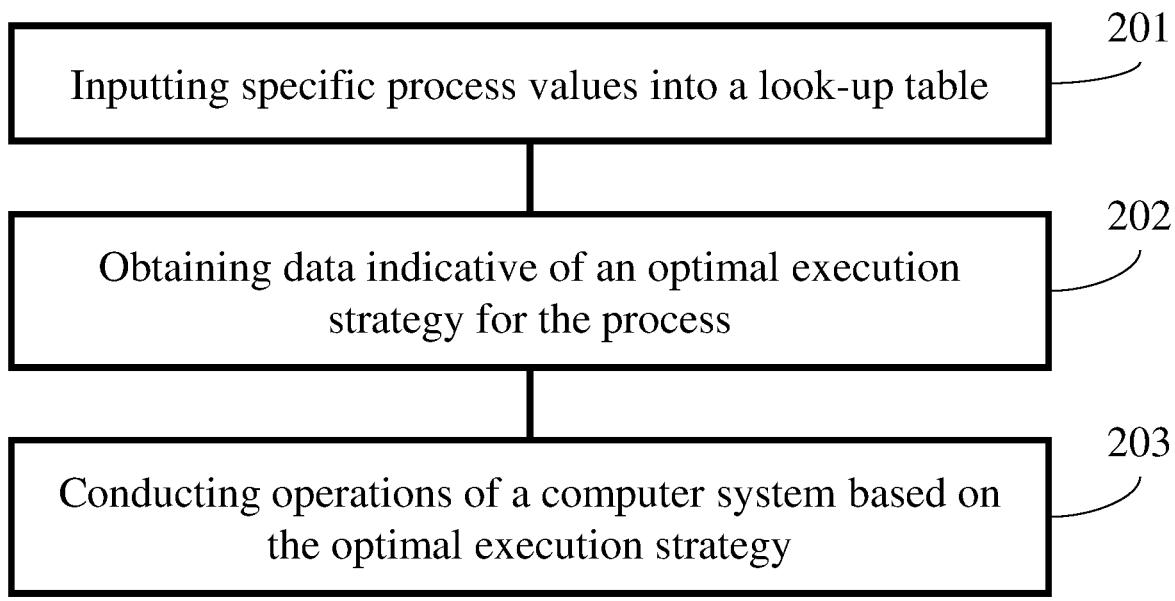
FIG. 2 is a flowchart outlining a method for selecting an optimal execution strategy for a process according to some embodiments of the invention.

FIG. 2 is a flowchart outlining a method 200 for selecting an optimal execution strategy for a process according to some embodiments of the invention. The method of FIG. 2 may be carried out on a computational device (e.g., the computational devices of FIGS. 1A and 1B, or other equipment).

In operation 201 specific process values may be input into a look-up table. Step 201 may be performed to obtain data indicative of an optimal execution strategy for the process. For example, some of the specific process values may include a value of 90% (or 0.9) which represents the probability that example validation 1 may pass, a value of 10 seconds which represents the time taken to execute example action 1, a value of 20 which represents a cost of rolling back example action 2, etc. Specific process values may be determined, estimated, or measured by a user and then input into a computational device through an input device, or specific process values may be determined, estimated, or measured by a computing device. For example, specific process values, such as, time to execute or probability of success of validations or actions may be based on time and success data recorded when these validations or actions have been executed in the past. Past data may be averaged to obtain specific process values (e.g., the probability value of 90% may be reached, if, when validation 1 is run 30 times, it passes 27 times). Utilities of executing actions over time may be determined based on past user data, for example, how likely a user is to abort/lose interest in an action as the total time taken increases (based on previously acquired data). For example, a user may be likely to become frustrated with a webpage, login page, or computer application, and cancel loading the webpage, login page, or computer application if it takes a long time to load (e.g., there may be a 10% chance of a user aborting if a webpage takes between 0 seconds and 10 seconds to load, a 20% chance of a user aborting if a webpage takes more than 10 seconds to load, a 60% chance of a user aborting if a webpage takes more than 20 seconds to load, etc.). Specific process values, such as those above, may be input to a database or table, and the output may be a process, or tree, which can then be traversed to control the execution of a process.

A probability of success of an individual validation may depend on a specific device which is executing all or part of the process. For example, the location of a device may affect the success of an individual validation. The IP address of a device may affect (or have some correlation with) the probability of success of an associated individual validation.

The look-up table (or lookup table, LUT, reference table, etc.) may include a plurality of execution strategies each defined by general properties. The plurality of execution strategies may be defined by the general properties in that each of the plurality of execution strategies shares the same number of individual validations, the same number of actions, and/or the same global validation definition as the general properties. The plurality of execution strategies may be used to execute/run processes that are also defined by the general properties. The look-up table may take the form of any suitable data structure configured to provide an optimal execution strategy when given an input(s).

Each execution strategy may be or include a tree data structure including instructions for at least one of: at least one individual validation, and at least one action, wherein each of the at least one individual validation and the at least one action include property variables.

In some embodiments, the look-up table may include a utility function associated with each execution strategy. Each utility function may provide an indication of its associated execution strategy's utility as a function of the property variables.

The method 200 may include selecting the optimal execution strategy based on the utility of each execution strategy. The utility of each execution strategy may be calculated with the corresponding utility functions. For example, a look up table may be/include a forest of trees, each tree including a utility function whose inputs are the values input in operation 201. By way of an example, the inputted specific process values associated with the allowing access to a restricted area example may include: a face identification validation may have an 80% chance of success, there may be a computational cost associated with validating the name on an ID card of value 10, unlocking a door may take 2 seconds, etc. These values and others may be inputted into corresponding property variables in the utility functions of the look-up table.

The utility of an execution strategy may be indicative of how useful an execution strategy is. The utility of an execution strategy may be indicative of the degree to which the strategy produces positive outcomes when the strategy is executed. In some embodiments, a utility of the strategy may differ from the utility of executing a single action, in that the utility of the strategy may be based at least in part on the utility of executing each action in the process, the probability of success of validations, as well as the cost of all operations (e.g., actions and validations) in the process.

Selecting an optimal execution strategy may be based on the utility of each execution strategy, for example, selecting the execution strategy or utility function with the highest utility. Additionally or alternatively, for example in the case that multiple strategies have similarly high utility, embodiments may select a utility function with a high utility, and which is also a simple strategy (e.g., the shortest/smallest tree data structure of a selection).

Inputting specific process values into a look-up table may include inputting by a computing device each specific process value into a corresponding property variable in each utility function (a different utility function associated with each execution strategy), wherein each utility function may be stored in the look-up table. Inputting into a utility function may return a value indicative of the utility of the strategy associated with the utility function. A utility function may be written as a computational function in computational code, wherein specific process values are the inputs, which are assigned to the property variables, and wherein the output is a utility value.

In other embodiments, the look-up table may include multiple selections of specific process values/parameters, each selection associated with an execution strategy. The execution strategy associated with each selection of specific process values may be the execution strategy with the highest utility (optimal execution strategy) for the given selection of specific process values. For a given selection of specific process values, the execution strategy associated with highest utility may be found using a utility function associated with each execution strategy.

A look up table may be/include a forest of trees, each tree including a selection of at least one specific process values/parameters, for which the tree represents the optimal execution strategy.

Selecting an optimal execution strategy may be based on the execution strategy associated with a selection of parameters. In the construction of the look-up table, various selections of parameters may be generated, and these values may be inputted into a number of utility functions, each corresponding to an execution strategy. For each selection of parameters, an execution strategy may be selected with the highest associated utility function given the parameters as inputs. The selection of parameters may then be stored in the look-up table with the execution strategy.

Inputting specific process values into a look-up table may include comparing the (currently considered) specific process values to the multiple selections of parameters stored in the look-up table. If the currently considered specific process values are the same as (possibly within an error margin) one of the selections of parameters, then this selection may be chosen as a closest selection of parameters. If none of the selections of parameters is the same as the currently considered specific process values, then a closest selection of parameters may be chosen whose values correspond most closely or substantially most closely to those of the currently considered specific process values. There may be several suitable processes for assessing which selection of parameters corresponds most closely to the currently considered specific process values. For example, a least squares fit method may be used, or a selection of parameters may be chosen which has the lowest variance compared to the currently considered specific process values. The closest selection of parameters, however chosen, may correspond to an execution strategy, which may thereby be chosen as the optimal execution strategy for a process with the currently considered specific process values. The optimal execution strategy may be outputted by the look-up table as the optimal execution strategy.

In operation 202 data may be obtained (e.g., by the computing device), which is indicative of an optimal execution strategy for the process. Alternatively, the subject matter of step 202 may include part of step 201 or 203.

An optimal execution strategy may include for example a strategy of the look-up table with a high (possibly the highest) utility, for some given inputs.

Obtaining data indicative of an optimal execution strategy/obtaining an optimal execution strategy may include receiving the output of the look-up table of step 201, for example receiving from a look-up table a predefined tree structure. The output data of look-up table may take various forms. Data indicative of an optimal execution strategy for the process may include data describing the optimal execution strategy, such that the party/computational device that receives the data is able to construct or run the strategy. For example, the data indicative of an optimal execution strategy may define a first node and then at least one link from the first node to further nodes and may define the links from the further nodes, etc. Additionally or alternatively, the data indicative of an optimal execution strategy may include an algorithm (e.g., in the form of computer code) that is configured to run the optimal execution strategy when the algorithm is executed. Additionally or alternatively, data indicative of an optimal execution strategy for a process may include an identifier, such that the party/device that receives the data is able to select the strategy from a memory.

In operation 203, operations of a computer system may be conducted based on the optimal execution strategy. For example, a processor may traverse a tree to send actions to another processor, in order to execute the strategy. The other processor may execute the strategy (e.g. transfer data, allow access to a restricted area, etc.). In other embodiments the same processor or computer traversing a tree or analyzing a strategy may actually execute the strategy.

Conducting operations of a computer system may include sending instructions to at least one computational device and/or at least one processor. Conducting may include controlling the execution of instructions on at least one computational device.

Operations may be associated with execution of individual validations and actions. Operations may be the real/actual processes that individual validations and/or actions represent. For example, in the access to a restricted area example, operations may include sending electrical signals from a computational device to unlock a door, and/or recording image data with a person's face camera and an ID card camera, transferring the image data from both cameras to a computational device and performing a comparison (e.g., with the use of machine learning algorithms).

Conducting operations of a computer system may be based on the optimal execution strategy in that the conducting may carry out operations of a computer system in the order, or substantially in the order given by the execution strategy and directed by the outcome of any validation operations as stipulated by the execution strategy. Operations may be conducted by, for example, sending electrical signals in the computer system and/or to computer system peripherals (e.g., cameras).

In some embodiments, execution of an execution strategy may involve more than one computational device. For example, a first computer may traverse the execution strategy (e.g., in the form of a tree) and perform any individual validations, as instructed by the strategy, but may not execute actions. Instead, the first computer may instruct/conduct a second computer to perform/execute the actions based on the strategy. In a different embodiment, a first computer may traverse the execution strategy and instruct/conduct a second computer to perform/execute both the individual validations and the actions. Other configurations are also possible. In some embodiments, the transmitting of instructions between the first and second computers may take some time (e.g., 2 seconds) and this time may increase the time taken to execute the process. In some embodiments, the time to transmit between computers may form part of the time given by some of the specific process values.

Figure 3:
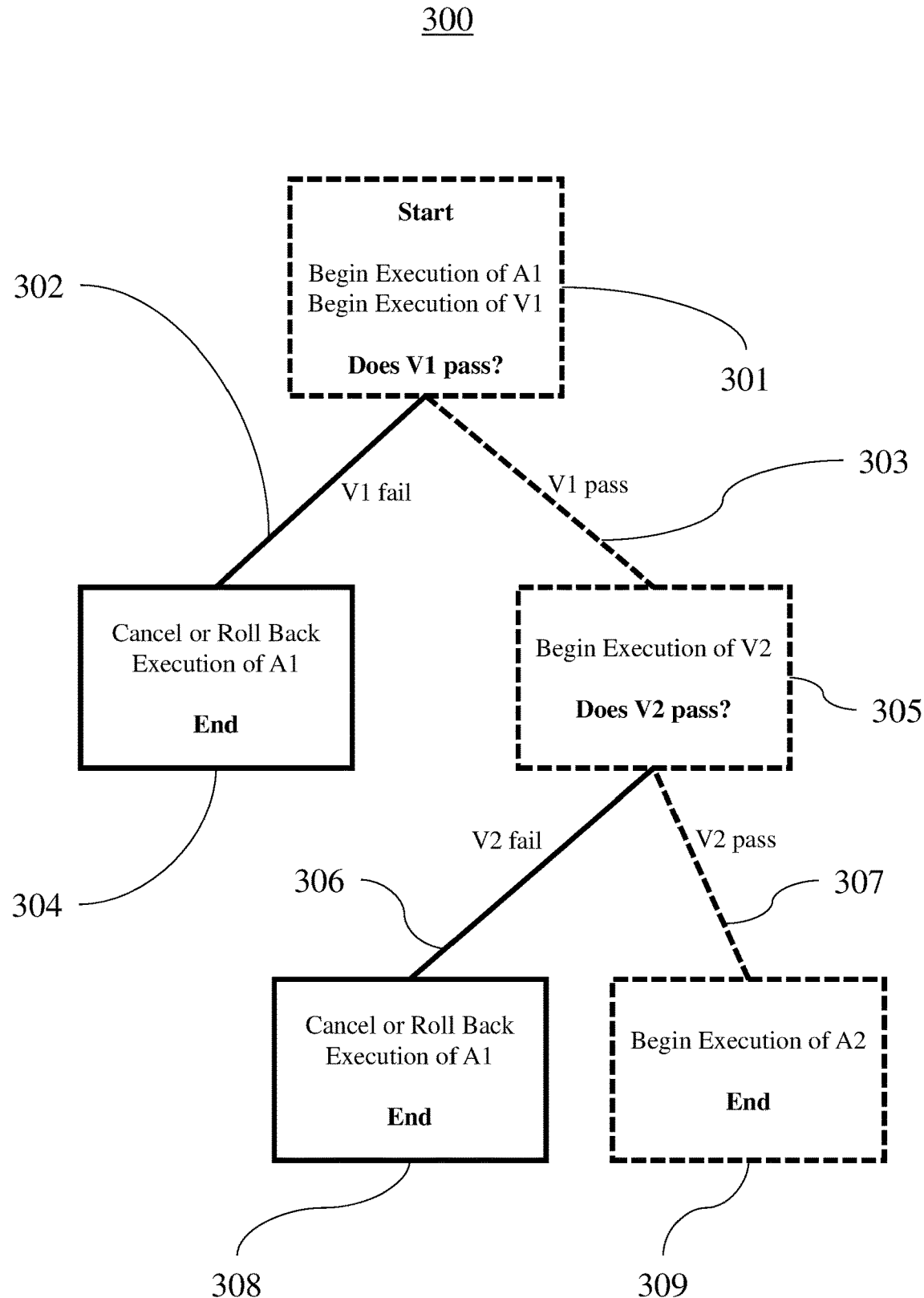
FIG. 3 is a schematic drawing of an execution strategy according to some embodiments of the invention.

FIG. 3 shows a schematic drawing of an execution strategy represented as a tree 300 which may be executed according to embodiments of the present invention. Rectangles in FIG. 3 may represent nodes, lines may represent links, and a single exemplary path of execution of the execution strategy is shown with a dashed outline. Execution strategies may include a root node (e.g., 301), at least one leaf node (e.g., 304, 308, and 309), nodes which are neither leaf nodes nor root nodes (possibly called branch nodes or connecting nodes) (e.g., 305), and links (possibly branches or connectors) (e.g., 302, 303, 306, 307). Nodes may include instructions. Nodes may include decision points, wherein decision points may decide which link to commit to, based on the result of a validation.

Example execution strategy 300 may be suitable/viable/relevant for a process with two actions (which are called A1 and A2 in FIG. 3), two individual validations (which are called V1 and V2 in FIG. 3), and wherein the global validation condition is that both validations must pass for the actions to be executed.

One possibility of a traversal of the execution strategy 300 is shown by the dashed outline of some nodes and links (301, 303, 305, 307, and 309). A computational device (e.g., the computational devices of FIGS. 1A and 1B, or other equipment) may execute the instructions contained at each node and follow a path decided by the conditions of the links. For example, with the traversal associated with the dashed outline, the computational device starts at the location of "Start" in node 301. Then the instructions order that the execution of A1 and V1 begin (perhaps substantially simultaneously). The computational device therefore begins execution of algorithms associated with A1 and V1. The next instruction of node 301 asks whether V1 has passed. In order that the computational device may know whether V1 has passed, it may need to wait until V1 has been fully executed by the computational device, and a result has been obtained (it may not be required that A1 has been fully executed). To verify whether V1 has passed, the computational device may check computational memory for data indicative of a V1 pass or fail. If individual validation V1 passes (is successful) the corresponding link 303 should be followed to the next node 305. The instructions of node 305 may order that the execution of V2 begins. The computational device therefore begins execution of algorithm(s) associated with V2. The next instruction of node 305 asks whether V2 has passed. In order that the computational device may know whether V2 has passed, it may need to wait until V2 has been fully executed by computational device, and a result has been obtained. To verify whether V2 has passed, the computational device may check computational memory for data indicative of a V2 pass or fail. If individual validation V2 passes (is successful) the corresponding link 307 should be followed to the next node 309. The instructions of node 309 order that the execution of A2 begins. The traversal of execution strategy 300 may then end, though it may not end until all validations and actions have finished executing. If either of the validations V1 or V2 failed, the traversal would have taken a different route to nodes 304 and 308 respectively. Both nodes 304 and 308 instruct that the execution of A1 be cancelled or rolled back. Note, that in this case, without further information on the relative lengths of time it takes to execute A1, A2, V1, and V2, it may not yet be known whether A1 will be fully executed by the time that a traversal of the execution strategy reaches nodes 304 or 308.

In some cases, the computational device above may be a first computational device, and one or more of the validations, such as validation V1 and/or V2, may be performed on a second computational device, and the result may be transferred back to the first computational device (e.g., via connections of a network connecting both computational devices). In these cases, the first computational device may be required to wait for the validation to be both executed by the second computational device and then transferred back to the first computational device. For example, an execution strategy may be traversed by a first computing device (e.g., a personal computer) and one validation of the associated process may include checking that the user of the first computational device has the right to access a server (linked to the computational device via some network). This validation may be performed by the server (e.g., by checking a whitelist of allowed users of the server), and the result may be transferred to the first computational device.

In some embodiments, at least one execution strategy of a plurality of execution strategies may comprise instructions to begin the execution of at least one action before the execution has finished for at least one individual validation. The execution strategy 300 may be one example of such a strategy, since, for example, action A1 is started at the same time as individual validation V1, and thus A1 begins executing before the execution has finished for V1. Beginning the execution of an action before the execution has finished for at least one individual validation may be called speculative execution. If the individual validation fails, the action may need to be cancelled or rolled back. In some embodiments, speculative execution may lead to a higher expected utility for the execution strategy.

In one specific embodiment of the execution strategy 300, the process may relate to computerized authentication, where a person may be allowed or disallowed access to a restricted area after they display an identification (ID) card, as discussed previously. A computer's execution/traversal of validation V1 may cause verifying whether a photo associated with the ID card is representative of the person as seen by a camera. Execution/traversal of V2 may include verifying whether a name associated with the ID card is present on a digital list of names that are allowed to enter the restricted area, as stored on computer memory. Execution of action A1 may cause an action in a computer to take place, for example unlocking a door to the restricted area, and execution of action A2 may include logging the entry of the person to the restricted area on a computer memory in a server.

Figure 4:
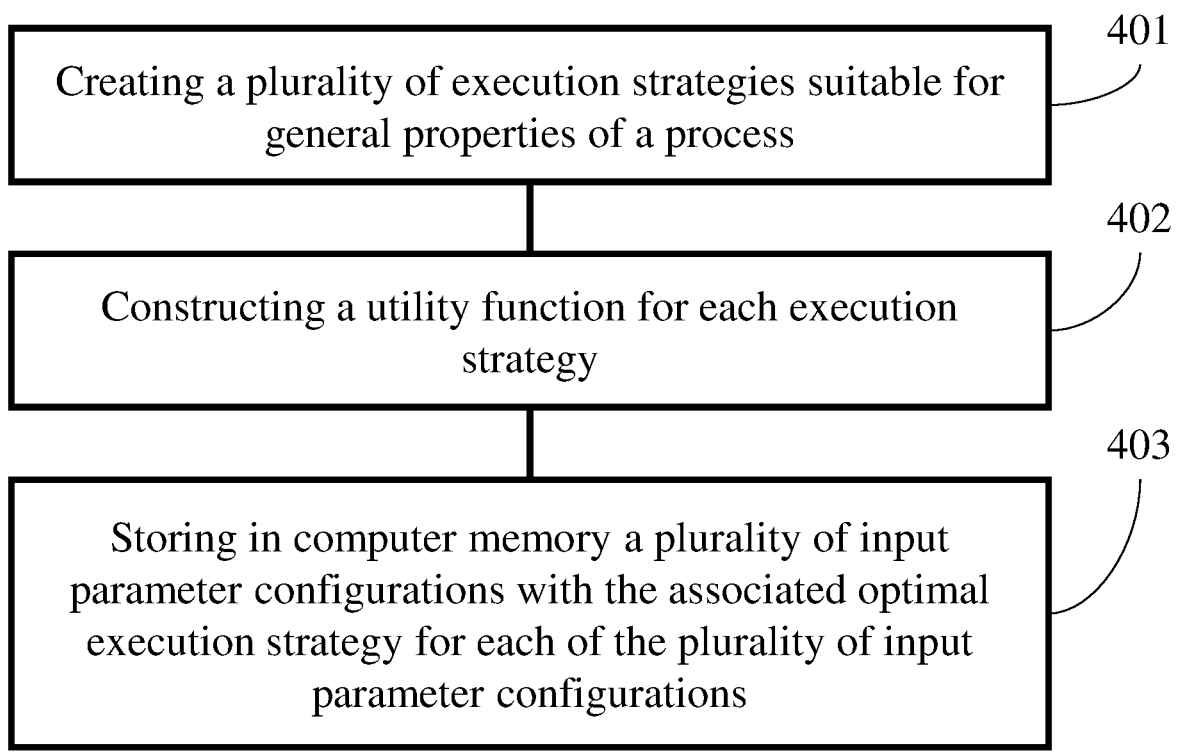
FIG. 4 is a flowchart outlining a method for constructing a look-up table according to some embodiments of the invention.

FIG. 4 is a flowchart outlining a method 400 for generating a look-up table or other data structure including general properties according to some embodiments of the invention. The look-up table may, in some embodiments, be suitable for a number of different processes, so long as the processes have the same set of general properties. The method of FIG. 4 may be carried out on a computational device (e.g., the computational devices of FIGS. 1A and 1B, or other equipment).

In operation 401 a plurality of execution strategies may be created. The plurality of execution strategies may be suitable for general properties of a process (e.g., if the general properties stipulate that there are three individual validations, then the execution strategies may have three validations).

Creating a plurality of execution strategies (also known as a forest) may include starting with at least one decision tree structure (for example, produced manually) and iteratively permutating the decision tree structure, and saving each newly generated tree structure. Creating a plurality of execution strategies may include at least one combinatorial process configured to create a number of permutations of decision tree structures given the general properties of a process.

For example, creating decision tree structures may include first creating validation tree structures, which only contain instructions relating to individual validations, and then adding instructions relating to actions. Creating validation trees may include, at a start point including instructions for executing any subset of the validations. After the execution of any action there may be divergent paths, for example for true or false. At the beginning of any divergent path, instructions for executing a new subset of validations may be included, so long as this new subset of validations contains no previously executed validations, and so long as the global validation has not been conclusively decided (whether true or false). This process of adding new validations to the beginning of divergent paths may be repeated until there are no further valid additions to the tree. Then the validation tree(s) can be converted to a decision tree by adding a subset of the actions to either the beginning of the validation tree, the beginning of any divergent path, or the end of any branch of the tree, so long as no action appears along one branch from root to leaf more than once. In one embodiment, if at any point in the tree, the global validation is shown to be false, the actions should be cancelled/rolled back. In one embodiment, if at any point in the tree, the global validation is shown to be true, all remaining actions should be executed. The above process may be executed by a computational device, and may be carried out until all possible trees have been executed, or until enough trees have been created according to a user-defined metric (e.g., more than 100 trees).

In some embodiments, each path from the root node to any of the leaf nodes may contain each action exactly once (assuming all actions must be executed with a success condition).

If given a global validation definition, a tree may be 'pruned'. For example, at a current node on a path from the root node to one of the at least one leaf nodes, it may be found, based on at least one success of individual validations, that the global validation definition has passed, or been successful, before reaching a leaf node. In such a case, subsequent nodes along the same path may be of no use and said subsequent nodes may be removed (or pruned) from the tree, such that the current node is made into a leaf node. For example, if the global validation function requires that either validation A or B pass, and, by some point in a tree, validation A has passed, validation B need not be subsequently executed.

In some embodiments, multiple forests (or multiple pluralities of execution strategies) may be constructed, such that each forest may provide strategies for different general property sets. For example, one forest may provide execution strategies for processes with two actions, three validations, and where all validations must pass for a success condition, and a different forest may provide strategies for processes with five actions, four validations, and where any of the validations must pass for a success condition.

In operation 402 a utility function may be constructed for each execution strategy.

Each validation in the execution strategy may be associated with a probability of success. The probability of success of a validation may be used to decide which node is visited/executed next in the execution of a strategy. Step 402 may include calculating for each path in the execution strategy, a probabilistic measure of utility for the path, or path utility function.

For each path through a strategy, the following example formula of path utility may be calculated/carried out:

$$U_{path} = \sum_{actions} U_{action}(t) \cdot P_{executed} \cdot P_{not\ cancelled} \cdot P_{not\ rolled\ back} - C_{action} \cdot P_{executed} - C_{roll\ back} \cdot P_{rolled\ back} - \sum_{validations} C_{validation} \cdot P_{executed},$$

where U may represent a utility, t may represent time, P may represent some probability (of an event given by the subscript), and C may represent some cost. The probabilistic utility of a single path/single path utility function through an execution strategy may be found using the above formula. Variations of the above formula may alternatively be used. The probabilistic utility of a single path may be given (as a formula) in terms of property variables (e.g., dummy variables).

The execution strategy tree structure may be traversed in all possible paths from root node to leaf node (e.g., each possible way). This may be achieved with any suitable graph traversal algorithm, such as depth-first search algorithms or breadth first search algorithms. For each traversal, a probabilistic utility of each path (or path utility function) may be found. Traversing a tree may include moving from a node to a node linked to that node, and continuing on another node via link, repeatedly.

Once the tree has been traversed in all possible ways, each probabilistic utility of each path may be summed together (and, if possible, algebraically simplified). The summed function may be described as the utility function of the execution strategy. The utility function may be configured to receive inputs for each property variable in the execution strategy and return a value indicative of utility for its associated execution strategy.

In some embodiments, constructing a utility function for each execution strategy includes: traversing the tree data structure of each execution strategy in each possible way; constructing a tree function of property variables for each possible way of traversing the tree; and combining each tree function to create the utility function.

In some embodiments, execution strategies with negative utility functions may be ignored/discarded or removed from the forest.

In some embodiments, after (or before or during) the construction of one or more trees and their utility functions, the previously mentioned system statistics (which, in some embodiments, are all the specific process values not related to probabilities, e.g., all costs, times, and utilities) may be inputted into their corresponding property variables. In some embodiments, the system statistics may include utilities and costs (e.g., of executing or rolling back). Inputting said system statistics may substantially simplify the utility functions in the look-up table, but may narrow their applicability to a specific instance or system.

In some embodiments, in operation 403 each execution strategy may be stored with the associated utility function (e.g., the utility function for the execution strategy). Step 403 may include storing in a computer memory.

Storing a strategy may use a data structure suitable for storing a utility function alongside associated data indicative of the corresponding execution strategy. For example, the data structure may be a table data structure or a map data structure, such that a strategy is stored with its utility function.

The methods above may be implemented on any suitable computational device or computational system (e.g., the computational devices of FIGS. 1A and 1B), or any suitable combination of computational devices (e.g., one method step may take place on one device and a different method step may take place on a different device).

Alternatively, in operation 403 a plurality of possible sets of parameter inputs may be constructed, wherein each possible set of parameter inputs may be stored with the associated optimal execution strategy for the possible parameter input.

A plurality of possible parameter inputs may be constructed that may correspond to possible or likely inputs of specific process values. Alternatively, possible parameter inputs may correspond to the previously discussed transaction statistics (a subset of the specific process values which are more likely to change between specific instances of the process being executed). In some embodiments, transaction statistics may be related to the probability of success for each individual validation. For example, possible parameter inputs for a probability parameter/variable may be given as [0.0, 0.1, 0.2, 0.3, 0.4, 0.5, 0.6, 0.7, 0.8, 0.9, 1.0]. A greater or lower precision may be used (the values need not be spaced regularly and there may be greater precision around a more likely set of values). A plurality of possible parameter inputs may include multiple sets of possible values. If, for example, the plurality of possible parameter inputs is for two transaction statistics, for which 10 possible values have been generated each, there may be 10 multiplied by 10 (i.e. 100) possible combinations of the values for the transaction statistics. Each possible combination may be inputted into a utility function for each execution strategy, and for each possible combination, the execution strategy with the highest expected utility may be selected. Each combination of values (or a selection of the more likely combinations) may then be stored in a look-up table or other suitable structure with a corresponding highest utility execution strategy. During use, specific process values (or transactions statistics) may be input, and the combination of parameter values which is closest in value to the specific process values may be selected, and the associated execution strategy may be outputted as the optimal execution strategy for the given specific process values. This alternative operation 403 may reduce the time taken to receive an optimal execution strategy for a process.

In some embodiments, a number of possible execution strategies may appear multiple times in the same look-up table, since these execution strategies may be the optimal execution strategies for multiple different sets of specific process values. A number of possible execution strategies may not appear in the look-up table at all, since these execution strategies may not be the optimal execution strategies for any given sets of specific process values.

Figure 5:
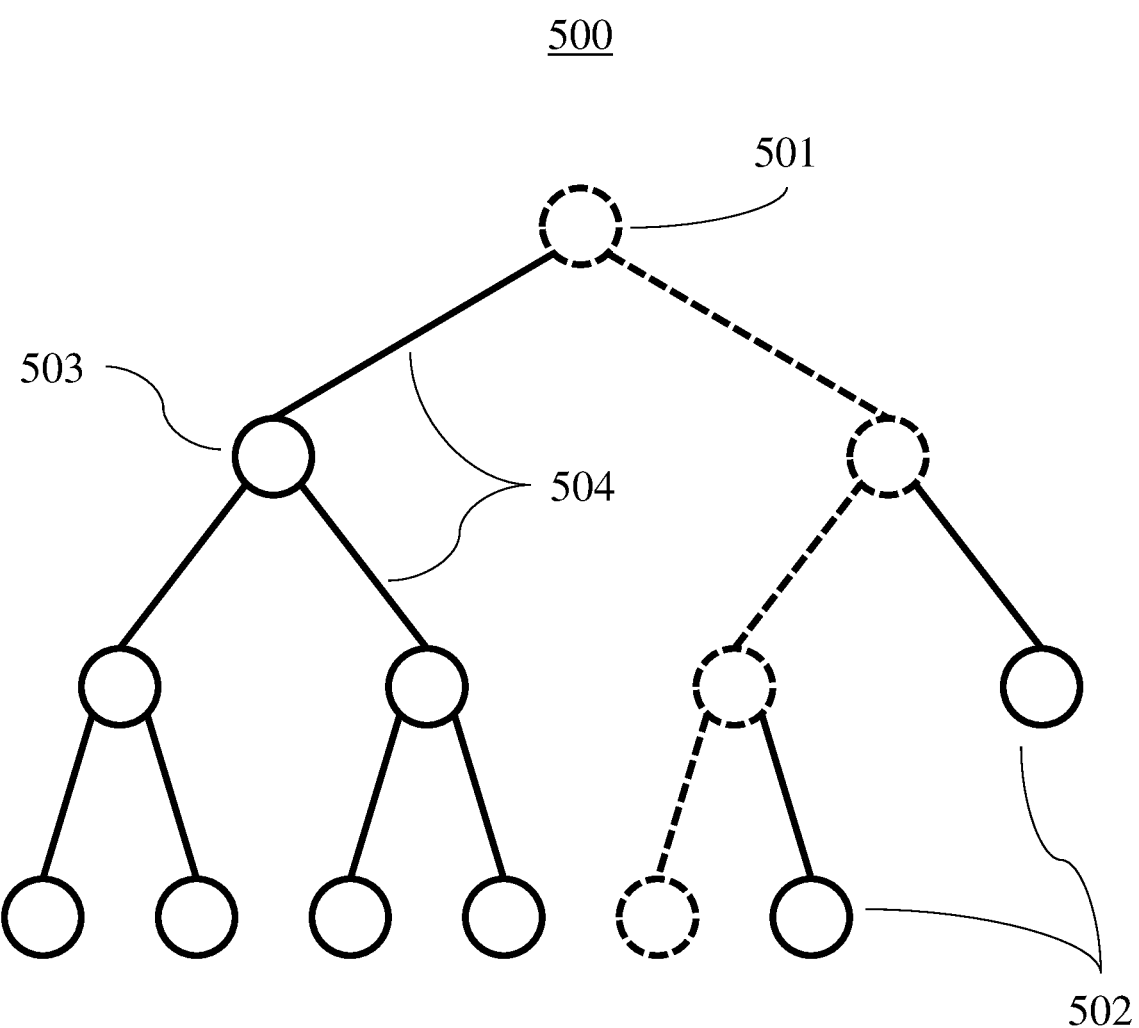
FIG. 5 is a schematic drawing of a data tree structure according to some embodiments of the invention.

FIG. 5 shows a schematic drawing of an exemplary tree data structure 500 according to some embodiments of the invention, wherein circles may represent nodes, lines may represent links, and a single exemplary path of the tree is shown with a dashed outline. In some embodiments, execution strategies may have a similar structure to the tree data structure of FIG. 5. Tree data structure 500 may include a root node 501, leaf nodes 502, nodes which are neither leaf nodes nor root nodes 503 (possibly called branch nodes or connecting nodes), and links (possibly branches or connectors) 504. Nodes may include instructions. Nodes may include decision points, wherein decision points may decide which link to commit to, based on the result of a validation.

In some embodiments of the invention, an execution strategy may be used during execution of a process, such that a process execution may be based on the execution strategy. The execution strategy may include a tree data structure comprising linked nodes, wherein the set of nodes may include a root node and at least one leaf node. A method for executing the process may include traversing linked nodes of the tree data structure, starting at the root node, and ending at one of the at least one leaf nodes, and executing instructions associated with each traversed node, wherein the instructions may relate to at least one validation and at least one action, wherein a route of the traversing is based on at least one outcome of executing at least one of the at least one validation. In some embodiments, the tree data structure may be a binary tree data structure.

The instructions that may be associated with each traversed node may include, for example: beginning an execution of an action; cancelling an execution of an action; rolling back an action after the action has been executed; beginning an execution of an individual validation; and cancelling an execution of an individual validation. Actions may, for example, be related to a computer system causing a transfer of a resource; a computer system allowing access for a user to a computer system; and a computer system allowing access for a user to a location.

Embodiments may be used to control a wide variety of processes. An embodiment may control (e.g., via a first computer traversing a tree including actions and validations) the process (e.g., executed by a second computer, or by the first computer itself) of allowing or disallowing access for a person to a restricted area after they display an ID card. By way of example, operations (individual validations and actions) for this process may include: verifying whether or not a photo associated with the ID card is representative of the person as seen by a camera (individual validation); verifying whether or not the person is known on security systems (individual validation); verifying whether or not the person has clearance to enter the restricted area (individual validation); verifying whether or not there has been a security system override (for example, in an emergency) (individual verification); unlocking doors (action); logging an entry request (action); informing security services of an unsuccessful entry request (action); and informing the person that they may or may not enter (action). In embodiments, there may be a success condition or global validation condition of the process, associated with a number of the actions. In one exemplary embodiment of the above, a global validation may be defined as: a pass for each of the photo and camera verification, the verification for being known on a security system, and the clearance to the restricted area verification, or alternatively simply a pass for the security override verification. If the global validation is met, the doors may be unlocked, an entry request may be logged, and the person may be informed that they may enter (i.e., the relevant actions are executed). In some embodiments, if the success condition is failed, an entry request may be logged, the person may be informed that they may not enter, and the security services may be informed of an unsuccessful entry request. Execution of individual verifications and actions in this example may be achieved with a computer device associated with a security system. The security system may include, among other things, a camera for capturing images of the person's face, an additional camera for capturing images of the ID card, a door whose locks may be controlled electronically, and some form of data communication connection between the devices (e.g., wiring). The computer device may execute an optimal execution strategy for the process, wherein executing validations and actions may involve electronically communicating between the computing device and the other security system components (e.g., to unlock the door, signals may be sent, via wiring, from the computer device to the electronically controllable locks of the door). A memory associated with the computer device may store data indicative of specific process values for the process, for example, an expected length of time the camera verification may take, a probability that there has been a security override, and hence that the corresponding verification would be successful, the cost of rolling back the logging of an entry request (e.g., computational cost associated with changing the log), etc. The memory may also store the general properties of the process.

By way of a separate example, a process may include negotiating/establishing a channel for a cell phone to work on. Individual validations for this process may, for example, include: verifying that the cell phone has a valid SIM card, verifying that the SIM card is not on a police database, verifying that the SIM card has a valid associated phone contract, and verifying that the SIM card has sufficient associated credit. It may be required by the global validation condition that the first two verifications pass and at least one of the last two verifications passes. Actions for this process may include: assigning network bandwidth to the cell phone and establishing a connection between the cell phone and another device. A phone provider's server may input specific process values into a look-up table (which may be stored in the server's memory) and may receive an optimal execution strategy for the process, which may be provided in the form of computer code. The server may execute the computer code in order to execute the process. Actions associated with the execution strategy may effect changes to systems associated with the phone provider's server, such as cell phone masts and databases.

By way of another example, a process may include writing data to computer memory by a computational processor. Individual validations used when describing this process (e.g. in a tree structure) may include checking various file-system permissions, for example, whether the processor has permission to write to a chosen area of computer memory. The global validation may require that all individual validations (in this case, all the file-system permissions) pass. There may be one action of writing data to the chosen area of computer memory. In the case that the action is executed and committed before the outcome of the global validation is known (e.g., speculative execution), the action may need to be rolled back, for example, in the case that the global validation fails. Rolling back the action may include removing the data that was written from the area of computer memory, for example, by switching each bit in the chosen area of memory to a zero (or to a one, or randomizing the value stored in the bits, or writing the data that existed in the chosen area of memory before the execution of the action).

Embodiments of the present invention may improve execution of different processes and provide an increase in speed of execution of processes, and/or may provide a reduced usage of computational resources during execution of processes.

Several examples are presented of processes, e.g., represented as trees, which may be traversed to control execution of the process.

Example 1: There may exist one validation, V1, with cost 1, length (time) 1, and which has 50% chance of succeeding. The global validation may pass if V1 succeeds. There may exist one action, A1, with cost 5, length 0.5, a rollback cost of 5, and a time dependent utility of $U(t=0.5)=10$, $U(t=1.5)=10$ (wherein t represents the time that A1 is fully executed). There may be two execution strategy trees in the forest. Either, in case 1, V1 is executed first, and then a choice is made as whether to execute A1, based on the result of V1, or, in case 2, V1 and A1 begin execution at the same time and a choice is made as whether to roll back A1 based on the result of V1.

Case 1:
  50% probability—V1 fails. A cost is incurred for executing V1 only, so the cost is 1, for a total utility value of −1.
  50% probability—V1 succeeds. A cost is incurred for executing V1 and A1, so the cost is 6. The utility of executing A1 at time 1.5 is 10, and thus the total utility value is 4.
  Together, the expected utility is 50%*−1+50%*4=1.5.
Case 2:
  50% probability—V1 fails. A cost is incurred for executing V1, for executing A1, and for rolling back A1. The total utility value is thus −11.
  50% probability—V1 succeeds. A cost is incurred for executing V1 and A1. The utility of executing A1 at time 0.5 is 10. The total utility is thus 4.
  Together, the expected utility is 50%*−11+50%*4=−3.5.

Thus, for example 1, the optimal execution strategy is given by case 1, since this gives a higher expected utility for the given specific process values Example 2: The above scenario may be repeated, but with an altered time dependent utility of $U(t=0.5)=18$, $U(t=1.5)=10$. This would change the expected utility value of case 2. Specifically, when V1 succeeds, a cost is incurred for executing V1 and A1, as before, but there is a new utility of executing A1 at time 0.5 of 18, giving a total utility of 12. The expected utility of case 2 is thus now 0.5. Thus, case 1 still gives the optimal execution strategy. If the time dependent utility were increased further to $U(t=0.5)>20$, then case 2 would become the optimal execution strategy.

Example 3: The scenario of Example 2 may be repeated, but with an altered length of time it takes to execute A1 of 2, and with a correspondingly altered time dependent utility of $U(t=2)=18$, $U(t=3)=10$. Once again, the expected utility of case 1 is not affected. However, in case 2, when V1 fails, the execution of A1 can simply be cancelled at time 1 without incurring a cost. Consequently, no cost is incurred for rolling back A1, as in example 2. Thus, the utility value if V1 fails is −6, giving an expected utility value for case 2 of 50%*−6+50%*12=3. Therefore, the optimal execution strategy in example 2 is given by case 2.

Example 4: The scenario of Example 2 may be repeated, but with the addition of a new case: case 3, as well as further defining the time dependent utility as U(t=0.5)=18, U(t=1)=14, U(t=1.5)=10. Case 3 may be the same as case 2, but wherein action A1 is extended such that the outcome of V1 is known before A1 is either committed or freely cancelled. A1 may be extended by, for example, a length of 0.5.

Case 3:
- 50% probability—V1 fails. A cost is incurred for executing V1 and A1, but no cost is incurred for rolling back A1. The total utility value is thus −6.
- 50% probability—V1 succeeds. A cost is incurred for executing V1 and A1, and a utility is gained for executing A1 at time 1. The total utility is thus 14−5−1=8.

Together, the expected utility is 50%*−6+50%*8=1.

Thus, case 3 gives a better utility than case 2, but worse than case 1. Delaying the committing of an action may lead to higher utility in some cases.

Example 5: There may exist a process with two individual validations V1 and V2, and an action A1. There may be three combinations for the order of validations: V1 executed first (and if global validation condition not met, then V2 next), V2 executed first (and if global validation condition not met, then V1 next), or V1 and V2 executed at the same time.

For the action, there are five possible combinations for the location of the action A1: A1 may be at the root, A1 may be after V1 (fail or success), or A1 may be after V2 (fail or success). Since there may be two orders for the validations, there may be 10 options to consider.

If actions are independent, any action may have as many options as the others. So, if there exist two actions, and for the first action there are 15 options and for the second there are 15 options which need to be considered, this gives a total of 30. The number of possible cases is indeed 15*15 but since each action can be calculated by itself (because they are independent), only 30 must be considered. Therefore, cases of N validation and 1 action may be considered. The number of options in the case of M actions can simply be multiplied by M if the actions are independent.

If committing an action is decided to be delayed, the times in which the actions are started stay the same, however, calculating the utility of the action may become more complex. It may be that in one subtree an action will be committed and in another it will not (wherein a subtree is a portion of a tree after at least one branch, e.g., the combination of components 305 to 309 of FIG. 3 may form a subtree of tree 300). Once committing an action is available/possible, the decision of whether to commit, is made by comparing the expected utility of committing, to the expected utility of not committing until the next decision point. The utility may be independent of the starting time of the action. Once actions with two different starting times can commit, they will commit at a time independent of the starting time.

Example 6: There may exist a process with three individual validations, V1, V2, and V3. It may be helpful to use a formula to understand how many different trees are available to be considered. The formula for the number of available trees F, for one action and N individual validations may be $$F(N+1) = [2^N - 1][1 + 2F(N)],$$

where $$N \geq 1 \text{ or } F(N) = [2^{N-1} - 1][1 + 2F(N-1)],$$

where $$N \geq 2 F(1) = 2,$$

The formula for the number of available trees F, for M independent actions and N individual validations may be $$F(N+1, M) = M[2^{N-1} - 1][1 + 2F(N-1)],$$

where $$N \geq 1 \text{ or } F(N, M) = M[2^{N-1} - 1][1 + 2F(N-1)],$$

where $$N \geq 2 F(1, 1) = 2.$$

If the validations are not independent, but dependent on one another, such that not all possible orders are possible (for example, V1 must start after V2 starts, or after V2 finishes, etc.), this may reduce the number of trees.

Example 7: There may exist a process with two validations, V1 and V2, of which both need to pass.

|  | V1 | V2 |
|---|---|---|
| Time | 5 | 10 |
| Probability of success | 50% | 90% |
| Cost | 3 | 10 |

Options for Executing Validations:
1. Firstly, execute V1, and then execute V2 if V1 is successful.

a. Cost = 3 + 50% * 10 = 8 b. Time = 5 if $V1$ fails and 15 if $V1$ succeeds

2. Firstly, execute V2, and then execute V1 if V2 is successful.

a. Cost = 10 + 90% * 3 = 11.5 b. Time = 10 if $V2$ fails and 15 if $V2$ succeeds

3. Executing V1 and V2 in parallel.

a. Cost = 15 b. Time = 10

Option 1 may be better than option 2 in all circumstances and therefore option 2 may never be chosen. There may be a choice between option 1 and option 3, which may depend on the time dependent utility values/objective functions. There may be greater utility in early finishing of the utility. For example, the utility may be as follows:

| Time (t) for finishing validation successfully | Utility |
|---|---|
| 3 < t < 8 | 300 |
| 8 < t < 9 | 200 |
| 9 < t < 14 | 100 |
| 14 < t | 50 |

In this case option 3 is much preferable. The utility is 100, 50 bigger than option 1. The cost is 15, only 7 more than option one. So doing both in parallel makes a lot of sense. If on the other hand the time dependent utility function were:

| Time (t) for finishing validation successfully | Utility |
|---|---|
| 3 < t < 8 | 20 |
| 8 < t < 9 | 10 |
| 9 < t < 14 | 5 |
| 14 < t | 4 |

Then option 1 may be better, because the added speed cost 7 while the added utility is only 1.

Example 8: For every action, a utility function may be given. For the following function utility of an action is given on the time that the action starts executing (or after a request is given). There may exist such a function for many utilities. For example:

| Time to start after request was generated | Utility 1 | Utility 2 | Utility 3 | Total utility |
|---|---|---|---|---|
| 10 | 175 | 100 | 75 | 350 |
| 15 | 150 | 100 | 50 | 300 |
| 20 | 120 | 100 | 50 | 270 |
| 25 | 100 | 100 | 50 | 250 |

Given the utility function, and the costs function of finishing the validation at specific time, the time for which Utility-Cost is the highest may be found and a validation strategy that finishes at this time may be chosen and executed.

| Time | Total utility | Validation cost | Value |
|---|---|---|---|
| 10 | 350 | 200 | 150 |
| 15 | 300 | 100 | 200 |
| 20 | 270 | 100 (time = 15) | 170 |
| 25 | 250 | 100 (time = 15) | 150 |

In the case above it may be found that the best timing is 15, so the validation may be optimally finished in at a time of 15. In some embodiments, both the utility and cost decrease, or don't increase, with time. The (time=15) in the parentheses designate that, even though a time of 20 or 25 is allowed to be used, only a time of 15 will be used.

If the utility of finishing the action fast is very high and the rollback is not expensive, it may be optimal to complete the action speculatively and rollback afterwards if required. If, on the other hand, there is no reward, there is a small reward for executing quickly, or rolling back is expensive, it may be optimal to wait until the outcome of validation(s) is certain before an action is implemented. The length of the action and the timing is also important, as, if a decision is expected to be made during the execution of the action, no roll back of the action will be required, and the action may only need to be cancelled. The decisions of what to do and when may be handled by a component called the speculative execution engine.

Example 9: A process may have 3 actions, A1, A2, and A3. They may have the following properties:
Action 1, time 3, probability of success of 80%, cost 5, cost to cancel 0, cost to rollback 10, cost for delay, if delay time greater than 7, 500 and failure of the action
Action 2, time 5, cost 1, cost to cancel 1, cost to rollback 5, cost for delay 1 if delay time greater than a day (i.e., very long)
Action 3, time 1, cost 5, cost to cancel 0, cost to rollback 1, cost for delay 5 if delay time more than 9.

The utility of an action done in time T may be U(T)= Probability(Global validation passes)*[Utility(Action, T)−Cost(Action, Execute)]−Probability(Cancelling Action|Global Validation fails)*Cost(Action, Cancel)−Probability(Rolling Back Action|Global Validation Fails)*cost(Action, Rollback), where it will be understood that a term such as Probability(Rolling Back Action|Global Validation Fails) may mean the probability of rolling back an action, given that the global validation fails.

If committing the action waits until the global validation is calculated, the probability Probability(Cancelling Action|Global Validation fails) may be time dependent (e.g., being able to cancel the process on time is time dependent). The probability of the global validation passing may be a single simple probability (e.g., P=78%). The expected utility at a time T+K may not be a specifical utility, but a set of probabilities which may sum to 100%, for example, 30% chance of U(T)=0, 25% chance of U(T)=46, 25% chance of U(T)=78, and 20% chance of U(T)=96. The expected utility for T+K can be calculated with a weighted sum. An action should be taken at any time if the utility is higher than any expected utility in the future. If the expected utility is a constant (not decreasing) over time, execution should wait until the global validation has been calculated, to avoid unnecessary cancelling or rolling back.

Example 10: At any point any number of validations may be executed. There may be no point in running a validation at a random point if no information was added. Information may be added when a validation task is complete. There may be many options for running/executing the validations. Assuming, for example, that there are three validation tasks:

| Validation task | a | b | c |
|---|---|---|---|
| cost | 6 | 100 | 10 |
| time | 5 | 7 | 10 |
| Probability of success | 50% | 80% | 10% |

The global validation in the example may be considered a success if all validation tasks complete successfully. In this case, the probability of success at the start may be 0.5*0.8*0.1=4%. The global validation could be a success if one individual validation succeeds (or any other function), and in this case the probability will be much higher (91%). The possible ways to run the validations may be seen in a graph (e.g., one the same as or similar to that of FIG. 4). The graph may have decision points. A decision point may be when a validation task has finished, a result is obtained (e.g., success, failure, 20), and a decision must be made, if there are still validation tasks available, of which of said remaining validation tasks, or which combination of them, to run. The entry to the graph (the beginning) may also be a decision point. It may be decided which validation tasks are run in parallel. The options may, for example, include running (a, b, c), (a, b), (b, c), (a, c), (a), (b), or (c). If (a, b, c) is chosen, there may be no more validations to begin executing, and the results can be observed after a time of 5 or 7 or 10. It may be that it is known after a time of 5 that validation a failed, and therefore the entire validation failed. If, after a time of 5, validation a succeeded, the probability of success may now be 8%. If validation a is executed first, a reply may be obtained at a time of 5, after which validations b and/or c may be executed separately or together. If validation a fails, there may be no point in doing anything further. If the global validation required two out of the three validations, then the validation process may continue.

The invention claimed is:

1. A method for executing a process using an execution strategy for the process, wherein the process comprises: a plurality of computerized validations and a plurality of computerized actions, wherein the execution strategy comprises a tree data structure comprising a plurality of linked nodes, and wherein the plurality of linked nodes comprise a root node and at least one leaf node, the method comprising, using one or more computer processors:
 traversing the plurality of linked nodes of the tree data structure, starting at the root node, and ending at one of the at least one leaf nodes; and
 executing computer instructions included in each traversed node, wherein each instruction relates to at least one of: a computerized validation of the plurality of computerized validations and a computerized action of the plurality of computerized actions, wherein the computerized validation comprises performing one or more checksums, wherein the computerized action comprises: one or more computing parts, and one or more committing parts, the committing parts comprising changing one or more data items stored in a computing device, wherein the committing parts are delayed based on at least one computerized validation of the plurality of computerized validations, wherein at least one computerized validation of the plurality of computerized validations and at least one computerized action of the plurality of computerized actions are configured to be executed in parallel, wherein one or more of the instructions comprise rolling back an action after the action has been executed, and wherein a route of the traversing is based on at least one outcome of executing at least one validation of the plurality of computerized validations.

2. The method according to claim 1, wherein the instructions comprise at least one of:
 beginning an execution of an action;
 cancelling an execution of an action;
 beginning an execution of an individual validation; and
 cancelling an execution of an individual validation.

3. The method according to claim 1, wherein at least one action of the plurality of computerized actions comprises at least one of:
 a computer system causing a transfer of a resource;
 a computer system allowing access for a user to a computer system; and
 a computer system allowing access for a user to a location.

4. The method according to claim 1, wherein the tree data structure is a binary tree data structure.

5. The method of claim 1, wherein the computerized validation comprises checking a database for the presence of one or more data points.

6. The method of claim 1, wherein the traversing of a plurality of linked nodes is performed by a first computer system, and wherein the executing of computer instructions associated with each traversed node is performed by a second computer system.

7. The method of claim 1, wherein the computerized action is executed based on a validation condition, the validation condition defined by at least one computerized validation of the plurality of computerized validations.

8. The method of claim 1, wherein rolling back an action comprises removing a log entry from a server.

9. A system configured to execute a process using an execution strategy for the process, wherein the process comprises: a plurality of computerized validations and a plurality of computerized actions, wherein the execution strategy comprises a tree data structure comprising a plurality of linked nodes, and wherein the plurality of linked nodes comprise a root node and at least one leaf node, the system comprising:
 a memory comprising the tree data structure; and
 at least one processor configured to:
 traverse the plurality of linked nodes of the tree data structure, starting at the root node, and ending at one of the at least one leaf nodes; and
 execute computer instructions included in each traversed node, wherein each instruction relates to at least one of: a computerized validation of the plurality of computerized validations and a computerized action of the plurality of computerized actions, wherein the computerized validation comprises performing one or more checksums, wherein the computerized action comprises: one or more computing parts, and one or more committing parts, the committing parts comprising changing one or more data items stored in a computing device, wherein the committing parts are delayed based on at least one computerized validation of the plurality of computerized validations, wherein at least one computerized validation of the plurality of computerized validations and at least one computerized action of the plurality of computerized actions are configured to be executed in parallel, wherein one or more of the instructions comprise rolling back an action after the action has been executed, and wherein a route of the traversing is based on at least one outcome of executing at least one validation of the plurality of computerized validations.

10. The system of claim 9, wherein the instructions comprise at least one of:
 beginning an execution of an action;
 cancelling an execution of an action;
 beginning an execution of an individual validation; and
 cancelling an execution of an individual validation.

11. The system of claim 9, wherein at least one action of the plurality of computerized actions comprises at least one of:
 a computer system causing a transfer of a resource;
 a computer system allowing access for a user to a computer system; and
 a computer system allowing access for a user to a location.

12. The system of claim 9, wherein the tree data structure is a binary tree data structure.

13. The system of claim 9, wherein the computerized validation comprises checking a database for the presence of one or more data points.

14. The system of claim 9, wherein the traversing of a plurality of linked nodes is performed by a first computer system, and wherein the executing of computer instructions associated with each traversed node is performed by a second computer system.

15. The system of claim 9, wherein the computerized action is executed based on a validation condition, the validation condition defined by at least one computerized validation of the plurality of computerized validations.

16. The system of claim 9, wherein rolling back an action comprises removing a log entry from a server.

* * * * *